United States Patent [19]

Mizude

[11] Patent Number: 4,796,060
[45] Date of Patent: Jan. 3, 1989

[54] AUTOMATIC EXPOSURE DEVICE

[75] Inventor: Kazuhiro Mizude, Toyonaka, Japan

[73] Assignee: Mita Industrial Co., Ltd., Osaka, Japan

[21] Appl. No.: 89,874

[22] Filed: Aug. 27, 1987

[30] Foreign Application Priority Data

Aug. 29, 1986 [JP] Japan .................. 61-204650
Aug. 29, 1986 [JP] Japan .................. 61-204649

[51] Int. Cl.⁴ .................. G03B 27/72; G03G 15/00
[52] U.S. Cl. .................. 355/68; 355/14 E; 355/69
[58] Field of Search .............. 355/68, 69, 14 E, 14 C, 355/14 R

[56] References Cited

U.S. PATENT DOCUMENTS

4,542,985 9/1985 Honma et al. .................. 355/69
4,684,239 8/1987 Takayanagi et al. ......... 355/14 E X Primary Examiner—L. T. Hix
Assistant Examiner—D. Rutledge
Attorney, Agent, or Firm—Antonelli, Terry & Wands

[57] ABSTRACT

An automatic exposure device for a photocopying machine. A signal indicative of exposure light intensity and a signal indicative of the received light intensity from an original are obtained by initially exposing two types of original documents the densities of which are different from each other. A proper exposure light intensity is established corresponding to the density of the original document to be copied on the basis of the above-obtained intensities. If the exposure light intensity changes in accordance with the density of an original document and the exposure light intensity to be changed should exceed an upper limit value or be less than a lower limit value, that limit value is established as the proper exposure light density.

8 Claims, 6 Drawing Sheets

AUTOMATIC EXPOSURE DEVICE

BACKGROUND OF THE INVENTION

The present invention relates to an automatic exposure device for a photocopying machine and more particularly to an automatic exposure device which automatically causes the output light intensity of the copying machine light source to be changed in accordance with the density of the original document so as to produce copies of the document of proper density.

There have conventionally been provided automatic exposure devices of the pre-scanning type and of the real-time type.

An automatic exposure device of the pre-scanning type is designed to cause the optimum power to be applied to a light source to enable copying of the lowest density portion of the original document, after the original is once exposed and before performing the image forming operation.

An automatic exposure device of the real-time type is designed to set up an optimum power to be applied to the light sorce with respect to the density of an original at each point of sensing the density of the original while the image forming operation is being performed.

In either of above systems, it is necessary to accomplish the initial setting of the relationship regarding the received light intensity and the proper light intensity (hereinafter, this relationship is referred to as "light exposure characteristic") so as to perform automatic exposure of light, and the initial setting of the above-mentioned relationship is accomlished manually.

To describe the above further in detail, the density of a copy is visually confirmed during the manual operation by copying a newspaper and a standard original, and adjustments are made to manually set the initial setting is manually of the light exposure characteristic based on the density of the copy obtained.

To make adjustments in the above, copying of the newspaper and standard original is repeated a number of times, causing problems in which not only the general work becomes complicated to accomplish the initial setting of the light exposure characteristic but also the time required for the work is extended.

An automatic exposure device of the pre-scanning type requires exposing of an original prior to performing the image forming operation, and so requires a long time before the first image of each original is formed. On the other hand, in an automatic exposure device of the real-time type, because the power to be applied to the light source is to changed in accordance with the density of the original at each point of exposure, there will be a problem in which, if there exists a black or solid area on the original, an area on both sides of the solid area will remain white wherein no image is formed, making it impossible to accomplish normal image formation which corresponds to character information and the like within that area.

SUMMARY OF THE INVENTION

An object of the invention is to provide an automatic exposure device which is capable of simplifying the initial setting of the light exposure characteristic performing automatic exposure.

Another object of the invention is to provide an automatic exposure device which is capable of reducing the time until the first image formation is performed with respect to an original and capable of preventing the generation of a whitened porton in a copy of an original.

The above objects of the invention can be achieved by providing an automatic exposure device of the following type: The automatic exposure device comprises proper intensity setting means to obtain the received light intensity and the proper light exposure intensity corresponding to originals of two types of density, operation means to generate a light exposure characteristic in accordance with the received light intensity and proper light exposure intensity obtained by the proper intensity setting means, and light exposure intensity calculation means to compute the light exposure intensity to be provided for an original to be copied based on the comparison between the received light intensity obtained by exposing an actual original to be copied and the light exposure characteristic.

In case the automatic exposure device of the above composition is available, the initial setting for automatic exposure can be accomplished by obtaining the received light intensity and proper light exposure intensity which correspond to originals of two types of density by means of the proper intensity setting means, and by creating the light exposure characteristic by means of the operation means based on the received light intensity and proper light exposure intensity.

Then, by means of the exposure intensity calculation means, the light exposure intensity to be provided for an original to be copied is calculated based on the comparison between the received light intensity obtained by exposing an actual original to be copied and the light exposure characteristic. Copies having an optimum density can be obtained by exposing an original to be copied based on the above-calculated light exposure intensity.

It is preferable that the originals of two or more types are paper for newspapers and standard originals for light intensity setting. In this case, based on both originals whose densities differ from each other considerably, it becomes possible to create the light exposure characteristic which can be used suitably for an original having an intermediate density of both originals.

The operation means may be one which creates a linear relationship for the light exposure characteristic. In this case, based on the received light intensity and the proper light exposure intensity with respect to two types of an original, it becomes possible to create the light exposure characteristic simply by plotting the points corresponding to the two types of an original.

The automatic exposure device can be incorporated as an automatic exposure device of the real-time type without any inconvenience, and copies can be obtained by performing a single scanning while the original is being exposed.

Other objects of the invention can be achieved by providing an automatic exposure device of the following type: The automatic exposure device comprises limit value setting means to set an upper limit value and a lower limit value of the light exposure intensity, light exposure intensity calculation means to calculate the light exposure intensity to be provided based on the density of the original, discrimination means to determine whether the light exposure intensity calculated by the light exposure intensity calculation means exceeds the limit value, and setting means to set the limit value as the light exposure intensity by using an input of a discrimination signal from the discrimination means which indicates that the light exposure intensity exceeds the limit value.

In case the automatic exposure device of the above type is available, the upper limit value and lower limit value of the light exposure intensity are set up in advance by the limit value setting means. The light exposure intensity to be provided is calculated by the light exposure intensity calculation means based on the density of the original obtained by exposing the original, so as to discriminate by using discrimination means whether the light exposure intensity calculated by said light exposure intensity calculation means exceeds the limit value. If the light exposure intensity does not exceed the limit value, it is possible to obtain copies of proper density by causing original to be exposed based on the light exposure intensity calculated as above. Conversely, if the light exposure intensity exceeds the limit value, the exceeded limit value is set up as the light exposure intensity by using the setting means, and it is possible to obtain copies without whitened portions and the like by causing the original to be exposed based on the light exposure intensity set up as above.

It is preferable that the upper limit value and the lower limit value for the light exposure intensity are values respectively corresponding to the paper for newspapers and to standard originals for light intensity setting.

In this case, a light exposure intensity corresponding to the newspaper is set as the upper limit value and a light exposure intensity corresponding to a standard original for light quantity setting is set as a lower limit value, and generation of whitened portions and the like can be prevented, even if the original has a solid area or the like, by exposing the original within ranges of these upper limit and lower limit values.

An automatic exposure device of the above type is capable of being incorporated into an automatic exposure device of the real-time type without any inconvenience and is capable of providing copies by performing a single scanning while the original is being exposed.

The advantages of the invention will become further apparent from the following description with reference to the attached drawings.

BRIEF DESCRIPTION OF THE DRAWINGS

FIGS. 1-1 and 1-2 are flowcharts of the initial setting operation in an automatic exposure device;

FIGS. 2-1 and 2-2 are flowcharts of the automatic exposure operation;

DETAILED DESCRIPTION OF THE EMBODIMENTS

Figure 5:
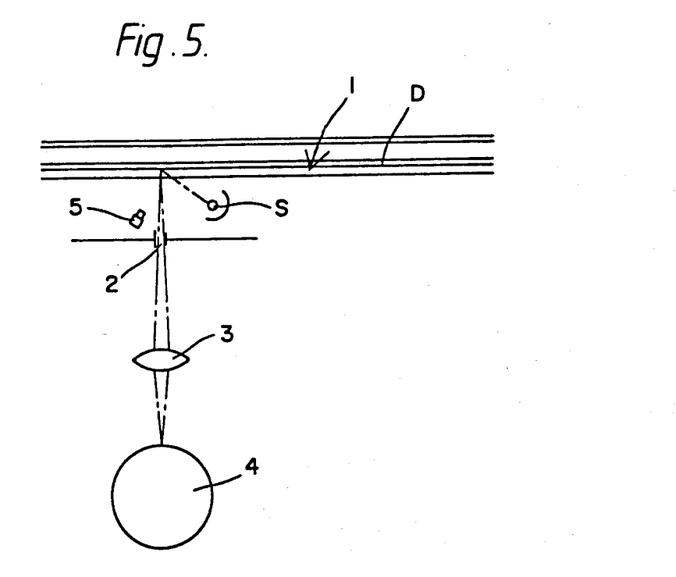
FIG. 5 is a schematic diagram showing essential parts of the automatic exposure copying apparatus.

FIG. 5 is a schematic diagram showing an embodiment of an automatic exposure device according to this invention. The automatic exposure device comprises an exposure lamp S which exposes the original D set on the upper surface of the reciprocatingly movable original tray 1, a slit 2 which guides the reflected light from the original D through a lens 3 to the photoreceptor drum 4. At a fixed position under original tray 1 there is a photo sensor 5.

Figure 4:
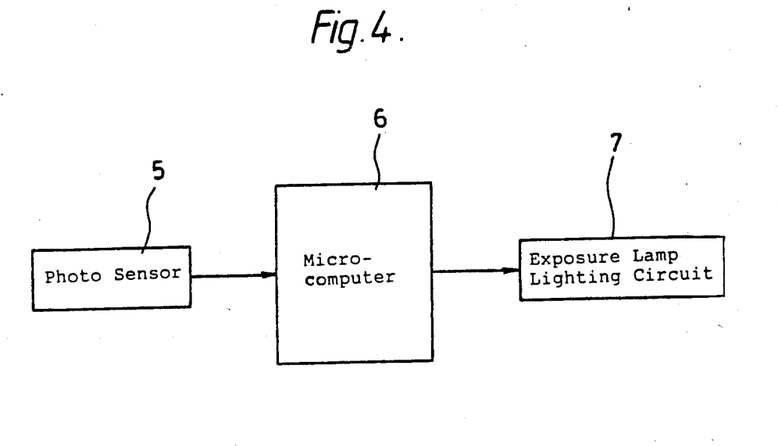
FIG. 4 is a block diagram showing an embodiment of electrical arrangement of an automatic exposure device.

FIG. 4 is a block diagram showing an electric arrangement of the automatic exposure device. The reflected light intensity detection signal from the photo sensor 5 is supplied through an A/D converter (not shown in the diagram) and an input interface (not shown in the diagram). to a microcomputer 6 containing a CPU, a RAM, and a ROM and the like. The control signal produced from the microcomputer 6 is supplied through an output interface (not shown in the diagram) and a D/A converter (not shown in the diagram) to an exposure lamp lighting circuit 7.

FIGS. 1 and 2 are the flowcharts describing operation of the automatic exposure device, with FIG. 1 showing the initial setting operation and FIG. 2 showing the automatic exposure operation.

Figure 11:
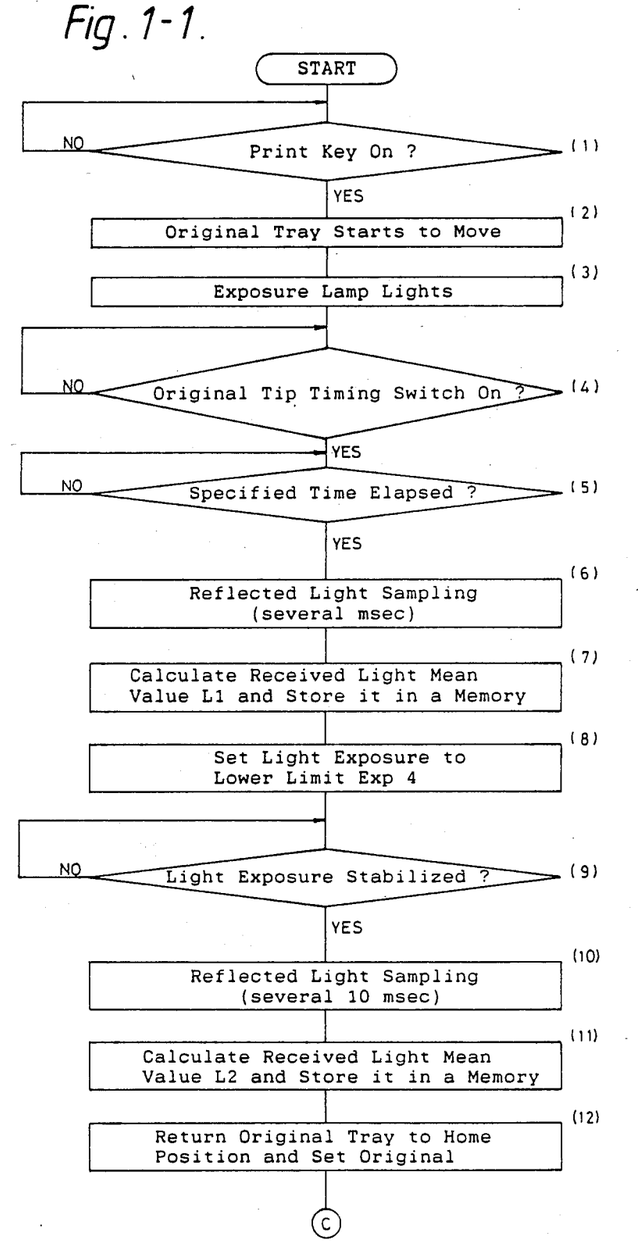
Figure 12:
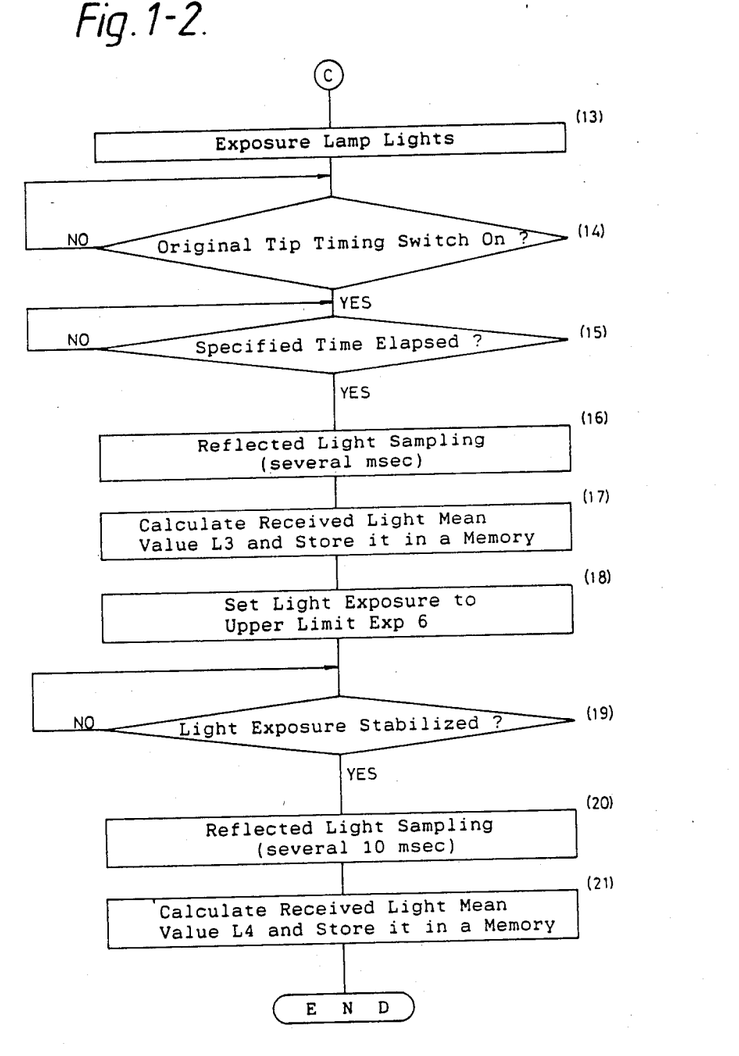

The initial setting operation will first be described with reference to FIG. 1. In step (1), a standard original for light quantity setting (hereafter abbreviated as NTC (new test chart)) is set and is caused to wait until the print key is turned on. Then the movement of the original tray 1 is initiated in step (2). After this, the exposure lamp S is caused to light in step (3). Under this condition, the exposure light intensity is set so as to be an intermediate value EXP 5 in a range of a predetermined exposure light intensity. The upper limit value of the range is the proper exposure intensity corresponding to an original document of rather high density such as the paper for newspaper or a newspaper original for testing, and the lower limit value of the range is the proper exposure intensity corresponding to an original document of rather low density such as NTC (Refer to FIG. 3.). In step (4), the operation waits until turning on of an original tip timing switch (not shown in the diagram) which actuates at a preset time to transport the copying paper to the photoreceptor drum. In step (5), the operation waits for a specified time after turning on of the original tip timing switch. After the exposure of the tip or leading edge of the original document is initiated in such manner, the reflected light from the tip section of the original document is sampled in the step (6). The required for this sampling is several msec. Because the tip section of a normal original is the texture thereof, it is possible to detect the light and shade of the texture of NTC by such sampling as above. In step (7), the mean value L1 (refer to FIG. 3.) of the sampled light intensity is calculated and is stored in a memory.

Then, in step (8), the exposure light intensity of the exposure lamp S is set to the lower limit value EXP 4. In step (9), the operation waits until the exposure light intensity of the exposure lamp S is stabilized from the EXP5 setting to the EXP 4 setting, and in step (10), the reflected light is sampled for a fairly long time (several tens of milliseconds). It is possible to detect the light and shade of the NTC in such manner, including parts of the textures, characters, and diagrams. In the step (11), the mean value L2 (refer to FIG. 3.) of the received sampled light intensity is calculated and is stored in a memory. In other words, the mean value L2 becomes the received light intensity when the NTC is exposed by the proper exposure light intensity EXP 4. Following the above, in step (12), the original tray 1 is caused to return up to the home position, a newspaper original for testing arranged with the similar density and characters to those of the paper for newspaper or a newspaper is set, and the discrimination and processing similar to those from the above step (3) to the step (11) are accomplished. However, the mean value L3 (refer to FIG. 3.) is calculated based on the received light intensity sampled under the exposure light intensity EXP 5, and the sampling is accomplished under the upper limit value EXP 6 instead of lower limit value EXP 4, to calculate the mean value L4 (refer to FIG. 3). The mean value L3 obtained in such manner becomes the received light intensity from the texture of the paper for newspaper or the newspaper original for testing, and the mean value L4 becomes the received light intensity when the paper for newspaper or the newspaper original for testing is exposed by the proper exposure light intensity EXP 6 including textures, characters, and diagrams thereof.

By performing the above series of operations, it becomes possible to obtain the lower limit value EXP 4 for exposure light intensity with respect to the NTC and the mean value of the received light intensity corresponding to the intermediate value EXP 5. It also becomes possible to obtain the upper limit value EXP 6 for the exposure light intensity with respect to the paper for newspaper or the newspaper original for testing and the mean value of the received light intensity corresponding to the intermediate value EXP 5.

Figure 21:
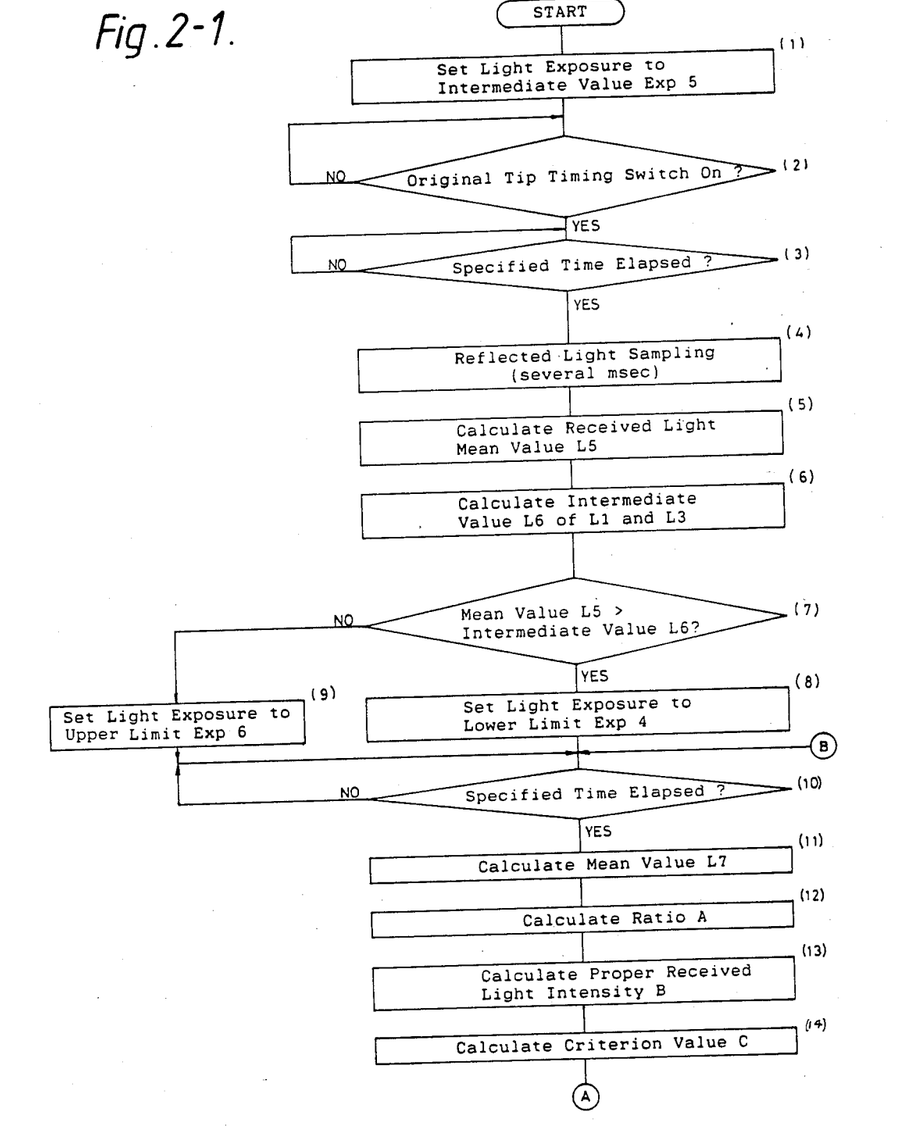
Figure 22:
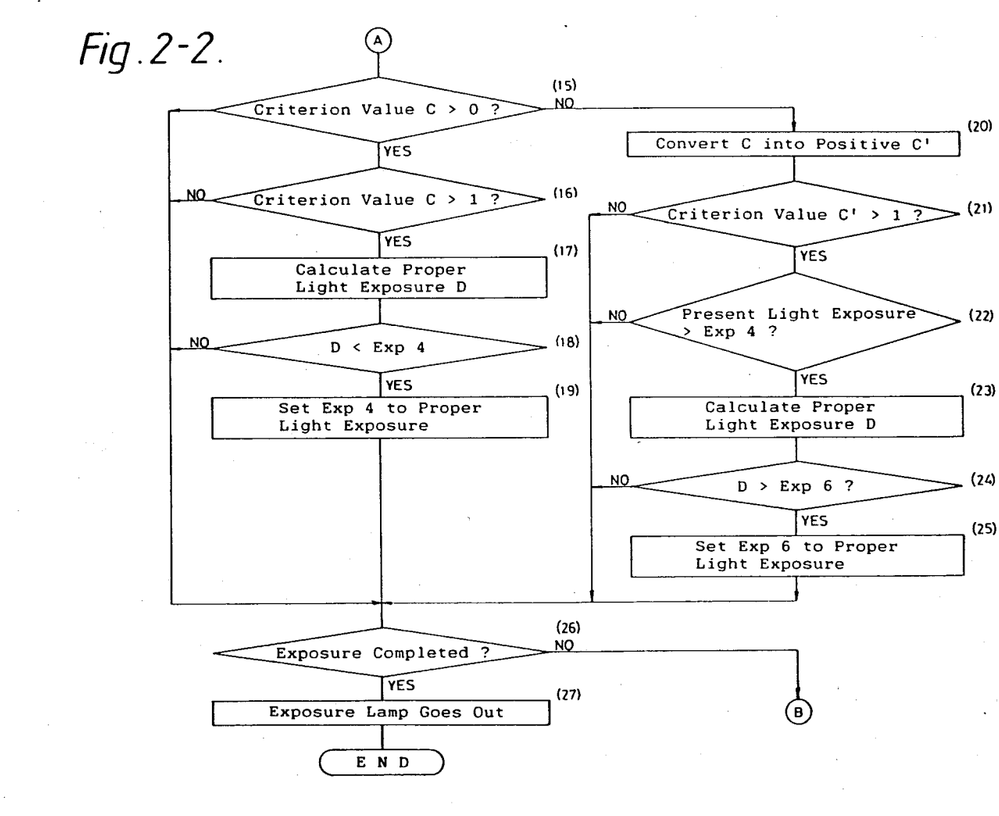

Next, the automatic exposure operation will be described referring to FIG. 2 in which a desired original document to be copied is set.

First, in step (1), the light exposure light intensity is set to the intermediate value EXP 5. In step (2), the operation is delayed until the original tip timing switch is turned on. In step (3), the operation is delayed for a specified time. In step (4), the reflected light from the tip section of an original document is sampled for a short time, i.e. several msec. In step (5), the mean value L5 of the sampled light intensity is calculated. In such manner, the received light intensity can be obtained from the texture portion of an original to be copied.

On the other hand, in step (6), an intermediate value L6 between the mean value L1 and the mean value L3 is calculated. This intermediate value becomes the mean value of the received light intensity from respective textures of the NTC, which is a light original, and the paper for newspaper, which is a dark original, or the newspaper original for testing. Therefore, this intermediate value becomes the value equivalent to received light intensity from the texture of the most standard density. In step (7), the magnitudes of the mean value L5 and the intermediate value L6 are compared, and if the mean value L5 is greater, it means that the texture of the original to be copied is lighter than that of the standard texture. In this case, the exposure light intensity is set to the lower limit value EXP 4 in step (8). If the mean value L5 is smaller, it means that the texture of the original to be copied is darker than that of the standard texture. In this case, the exposure light intensity is set to the upper limit value EXP 6 in step (9). After either steps (8) or step (9) is accomplished, the operation is delayed for a specified time until the exposure light intensity becomes stabilized in step (10), and the reflected light from the original document is then sampled for a specified time in step (11), thereby permitting obtaining of the mean value L7. In such manner as above, the received light intensity is determined when an original to be copied, including the texture, character, and diagram thereof, is exposed.

Figure 3:
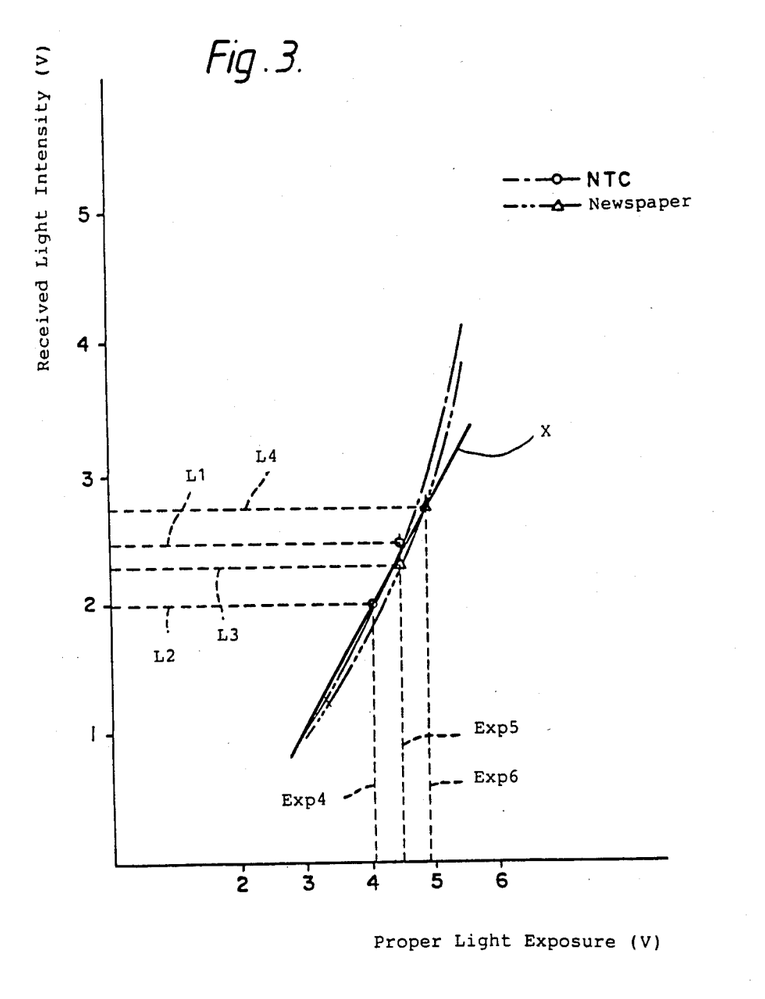
FIG. 3 is a light exposure characteristic chart describing the initial setting operation and the automatic exposure operation.

On the other hand, in step (12), the ratio A is calculated of the difference between the exposure light intensity under the present conditions and the lower limit value EXP 4 to the difference between the upper limit value EXP 6 and the lower limit value EXP 4, where the exposure light intensity under the present conditions, the upper limit value EXP 6, and the lower limit value EXP 4 can be obtained from the voltage value to be applied to the exposure lamp S. For example, if the exposure light intensity is equal to the EXP 4, $A=0$ holds, and if the exposure light intensity is equal to the EXP 6, $A=1$ holds. Then, the received proper light intensity B corresponding to the exposure light intensity under the present conditions is calculated in step (13). In practice, the received proper light intensity B can be obtained by performing the calculation of $B=A(L4-L2)+L2$. Instead of this calculation, the intersection of the EXP 4 and the value L2 and the intersection of the EXP 6 and the value L4 may be determined to define a straight line X through these intersections, and the received proper light intensity B corresponding to the exposure light intensity under the present conditions may be determined from this straight line X. Because this straight line X connects the received light intensity obtained by exposing a light original such as the NTC using the proper exposure light intensity EXP 4 and the received light intensity obtained by exposing a dark original such as the paper for newspaper or the newspaper original for testing using the proper exposure light intensity EXP 6, the straight line X becomes the reference straight line which represents the relation between the proper exposure light intensity and the received light intensity for any original which lies intermediate between the NTC and the paper for newspaper or the newspaper original for testing, that is to say, the relationship of the exposure light characteristic.

Next, the difference between the mean value L7 and the received proper light intensity B is obtained and the difference is divided by normalization factor n depending on charcteristics of the electrostatic copying apparatus. In detail, the normalization factor n depends on the sensitivity of the photoreceptor on the drum or belt. A criterion value C is calculated in step (14) as $C=(L7-B)/n$.

In step (15), whether the criterion value C is positive or not is determined. In step (15), if the criterion value C is determined as positive, namely, if it is determined that the original is lighter than the standard density, whether the criterion value C is over 1 or not is determined in step (16). If determined as being over 1, it is necessary to reduce the exposure light intensity because the original document to be copies is considerably light. In this case, in step (17), a value D, obtained by subtracting the criterion value C from the exposure light intensity under said present conditions, is used as the proper light exposure intensity. In step (18), whether the value D is smaller than the lower limit value EXP 4 is determined. If it is determined that value D is smaller than the lower limit value EXP 4, then the lower limit value EXP 4 is set as the proper exposure light intensity in step (19). As stated above, an attempt is made to always prevent the exposure light intensity from becoming lower than the lower limit value EXP 4. In step (18) above, if the value D is determined as being greater than the lower limit value EXP 4, discrimination and processing after step (26) are accomplished based on the exposure light intensity obtained in the step (17). In step (26), whether the exposure is completed is determined. In step (26), if it is determined that the exposure is completed, the exposure lamp S is caused to go out in the step (27) and the process ends. Conversely, if the exposure is determined as not being completed, automatic exposure operation is caused to continue by accomplishing discrimination and processing after step (10) as they are. In step (16), if the criterion value C is determined as being less than 1, the original document to be copied is somewhat light. Therefore, discrimination and processing after step (26) are carried out without causing the exposure light intensity to change. If the exposure light intensity frequently changes in a single scan, there may arise fine flickers or stripes on the copied paper, therefore, the exposure light intensity is kept constant in this condition.

In step (15), if the criterion value C is determined as negative, the original to be copied is darker than the standard density. Therefore, in step (20), the criterion value C, is converted into a positive value C' and in step (21), whether the value C' is greater than 1 is determined. If it is determined that C' is greater than 1, in step (22) whether the exposure light intensity under the present conditions is greater than the lower limit value EXP 4 is determined. If it is determined that it is greater than the lower limit value EXP 4, a value D, obtained by adding the exposure light intensity under the present conditions to the value C', is used as the proper exposure light intensity in step (23), and whether the value D is greater than the upper limit value EXP 6 is determined in step (24). If it is determined as greater than the upper limit value EXP 6, the upper limit value EXP 6 is set up as the proper exposure light intensity in step (25) and discrimination and processing after step (26) are carried out.

In step (21), if it is determined that the value C' is less than 1, discrimination and processing after step (26) are accomplished without causing the exposure light intensity to change so as to prevent stripes on the copy. In step (22), if the present exposure light intensity is determined as smaller than the lower limit value EXP 4, discrimination and processing after step (26) are carried out as they are. In step (24), if the value D is determined as smaller than the upper limit value EXP 6, discrimation and processing after step (26) are carried out based on the exposure light intensity D obtained in step (23).

To summarize the above, the exposure light characteristic is obtained based on the initial set value obtained from the flowchart shown in FIG. 1. The received light intensity obtained by exposing an actual original document is compared with the exposure light characteristic, and the proper exposure light intensity can be obtained by carrying out four single arithmetic operations and discrimination of their magnitudes. By setting up the exposure light intensity based on this proper exposure light intensity, copies of proper density can be obtained.

In case the proper exposure light intensity is once set to the lower light value EXP 4, the exposure light intensity continues to be maintained at the lower limit value EXP 4. Therefore if a solid area is detected during operation, the quality of an image will not be reduced around the solid area.

The present invention has been described in detail based on embodiments of the automatic exposure device by referring to the attached drawings as above, but the invention shall not be limited to embodiments of above. For example, in an embodiment shown in FIG. 2, it is possible to calculate the criterion value C combined with a temperature compensation factor in step (14). It is also possible to omit step (5) shown in FIG. 1 and step (3) shown in FIG. 2 by mounting a special switch for detecting the timing to receive the reflection light from the original. In addition to above the invention shall be understood as capable of providing various other changes, unless deviating from the scope and the spirit of the invention.

In the manner stated above, during the initial setting for automatic exposure, the automatic exposure device of the invention is capable of obtaining the exposure light intensity and the received light intensity by exposing once for each of the two types of originals whose densities differ from each other, and the exposure light characteristic can be obtained based on these light intensities. Subsequently, when actually accomplishing automatic exposure operation with respect to an original to be copied, a proper exposure light intensity can be established corresponding to the density of the original to be copied based on the comparison with the exposure light characteristic. As a result of this, it becomes possible to considerably reduce the time required for the initial setting of light intensity for automatic exposure.

Further, the upper limit value and the lower limit value of the exposure light intensity are set up in advance and the upper limit value or the lower limit value is automatically selected as the proper exposure light intensity when the exposure light intensity exceeding these upper limit and lower limit values is calculated. Therefore, even if an original having a black-colored or solid portion is to be exposed, copies of high quality can be obtained without generating whitened portions and the like.

Furthermore, because the automatic exposure device of the invention in particular can be applied to an automatic exposure device of the real-time type, it is also possible to reduce the time required before the first copy is obtained.

What is claimed is:

1. An automatic exposure device for an image forming apparatus which has a photosensitive drum and which is to copy an original document, said device comprising:
    received light intensity obtaining means for obtaining received light intensity signals resulting from respectively exposing two documents which differ in density,
    operation means for generating a characteristic signal indicative of the relationship between the two received light intensity signals, and
    exposure light intensity calculation means for computing the exposure light intensity to be provided for the original document based on the comparison between the received light intensity signal obtained by exposing the original document and said characteristic signal.

2. An automatic exposure device according to claim 1, wherein the received light intensity signals are indicative of the proper exposure light intensity for the paper for newspaper and a standard original for light intensity setting.

3. An automatic exposure device according to claim 1, wherein the operation means generates a linear characteristic signal.

4. An automatic exposure device for an image forming apparatus which has a photosensitive drum and which is to copy an original document, said device comprising:
    limit value setting means for setting an upper limit value and a lower limit value for the exposure light intensity, exposure light intensity calculation means for calculating the exposure light intensity to be provided based on the density of the original, discrimination means for determining whether the exposure light intensity calculated by the exposure light intensity calculation means is greater than the upper limit value, is between the upper limit value and the lower limit value, or is less than the lower limit value, and setting means for setting the exposure light intensity in accordance with the determination made by the discrimination means of the relationship between the exposure light intensity and the limit values.

5. An automatic exposure device according to claim 4, wherein the upper limit value and the lower limit value for the exposure light intensity are indicative of the proper exposure light intensity for the paper for newspaper and a standard original for light intensity setting.

6. An automatic exposure device according to claim 1, wherein the exposure light intensity calculation means includes:

means for comparing (a) the received light intensity obtained by exposing the original document with light of the exposure light intensity with (b) the received light intensity corresponding to the exposure light intensity indicated by the characteristic signal, and means for computing an exposure light intensity to be provided to the original document based on the results of the comparison.

7. An automatic exposure device according to claim 6, wherein the intensity of the exposure light with which the exposure light intensity calculation means exposes the original document is limited within the range of two proper light exposure intensities respectively predetermined for each of two kinds of originals which differ in density.

8. An automatic exposure device according to claim 1, wherein the exposure light intensity calculation means includes:

means for determining the difference between (a) the received light intensity obtained by exposing the original document with light of the exposure light intensity and (b) the received light intensity corresponding to the exposure light intensity indicated by the characteristic signal, means for correcting the difference in accordance with the sensitivity of the photosensitive drum of the image forming apparatus, means for adjusting the exposure light intensity based on the corrected difference, and means for providing to the original document light of the adjusted exposure light intensity.

* * * * *